Patented Nov. 7, 1922.

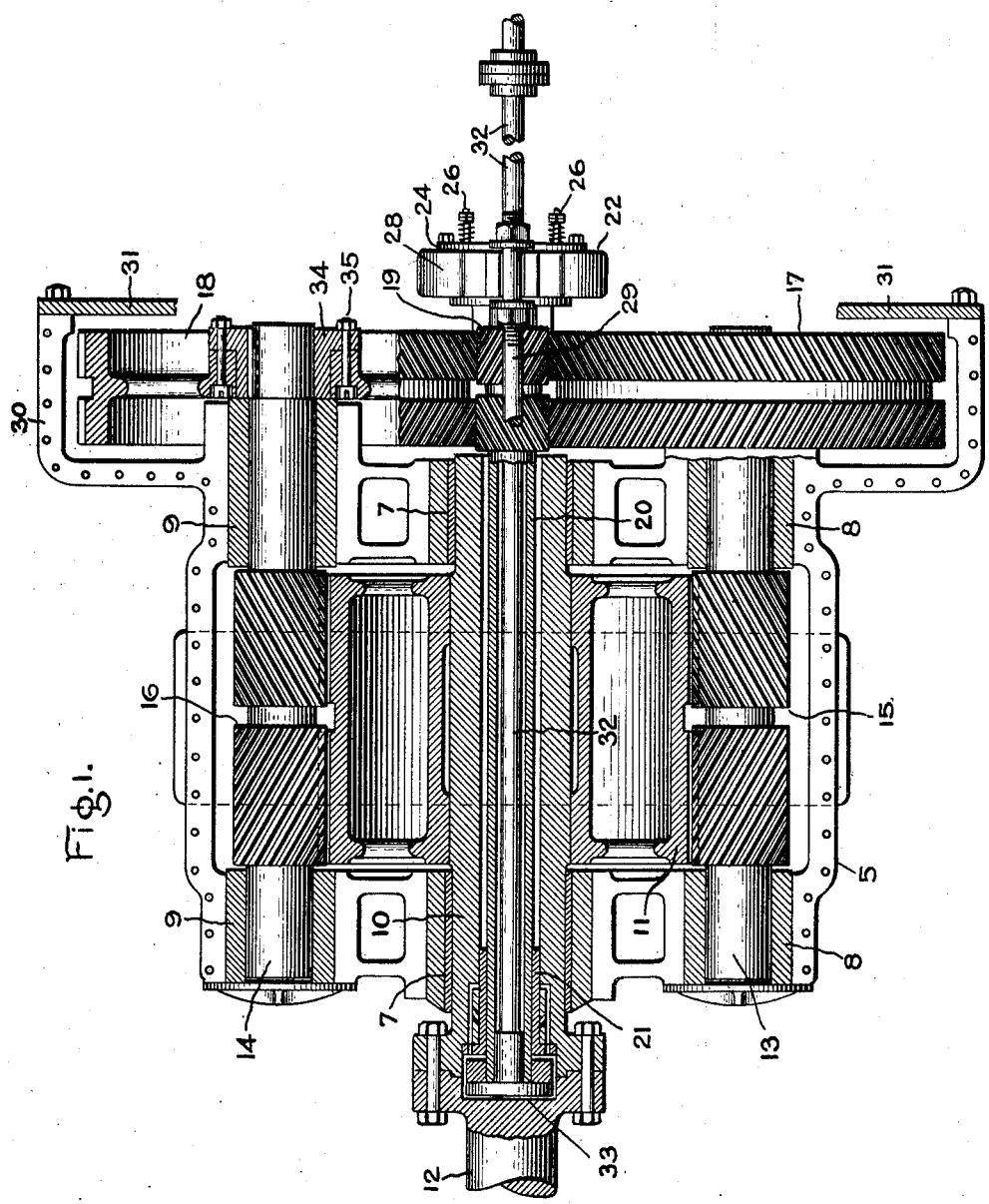

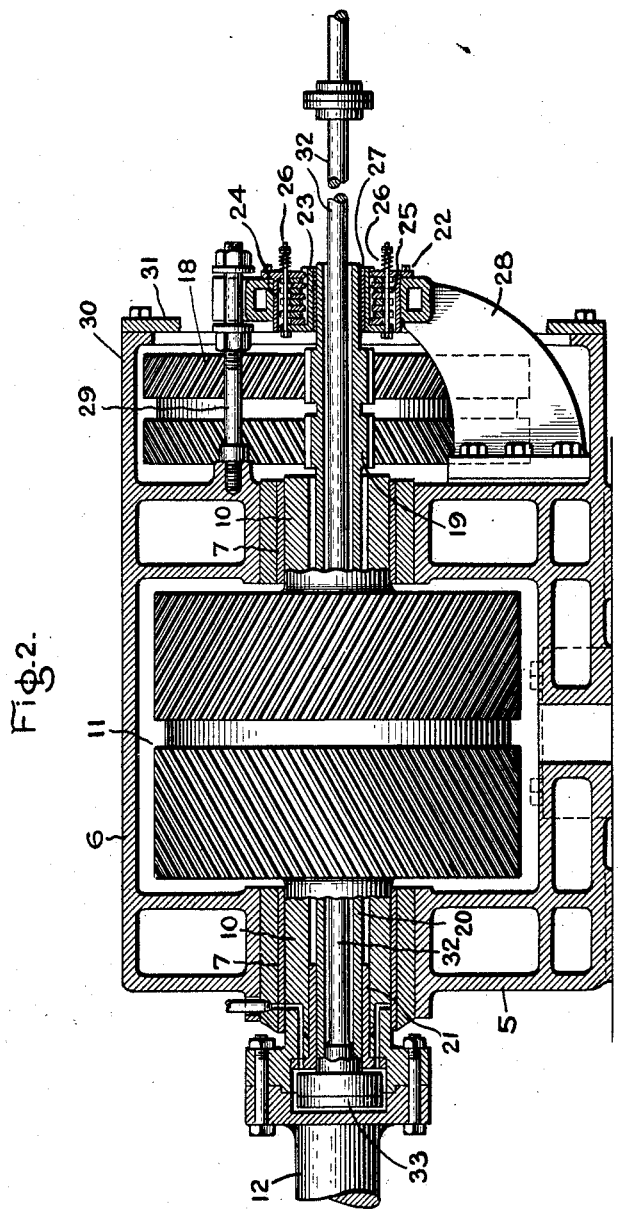

1,434,697

UNITED STATES PATENT OFFICE.

CHARLES L. HEISLER, OF SCHENECTADY, NEW YORK, ASSIGNOR TO GENERAL ELECTRIC COMPANY, A CORPORATION OF NEW YORK.

GEARING.

Application filed October 20, 1920. Serial No. 418,132.

*To all whom it may concern:*

Be it known that I, CHARLES L. HEISLER, a citizen of the United States, residing at Schenectady, county of Schenectady, State of New York, have invented certain new and useful Improvements in Gearing, of which the following is a specification.

The present invention relates to gearing and particularly gearing of the type wherein power is transmitted between a high speed pinion and a low speed gear by two or more sets of intermediate speed gear wheels which transmit the load in parallel, each set comprising a high speed gear wheel which meshes with the high speed pinion and a low speed pinion which meshes with the low speed gear wheel. Gearing of this type is adapted for either speed multiplication or speed reduction. The latter is the more common application, however, and the invention is accordingly more particularly described as a reduction gearing.

The object of my invention is to provide an improved structure and arrangement in a gearing of the type referred to, and for a consideration of what I believe to be novel and my invention, attention is directed to the accompanying description and the claims appended thereto.

In the drawing, Fig. 1 is a horizontal sectional view of a gearing embodying my invention, and Fig. 2 is a vertical sectional view thereof.

Referring to the drawing, 5 indicates the lower half of the gear casing and 6 the upper half, such casing being provided with three sets of bearings 7, 8 and 9, the bearing 7 being located at the axial center of the casing and the sets 8 and 9 on opposite sides thereof. In bearings 7 is mounted a hollow shaft 10, which carries a low speed gear wheel 11. Shaft 10 is provided at one end with a flange to which is coupled a driven shaft 12 of any desired device. One application to which my invention is well adapted is to a gearing for use in ship propulsion and in such instance shaft 12 may be a propeller shaft. In bearings 8 and 9 are located intermediate speed shafts 13 and 14 carrying low speed pinions 15 and 16 which mesh with gear wheel 11. As will be noted, the individual bearings of bearing sets 8 and 9 are spaced apart axially only sufficiently far for pinions 15 and 16 to fit between them. The right hand ends of shafts 13 and 14 project beyond bearings 8 and 9 and mounted on such ends are high speed gear wheels 17 and 18, such gear wheels being thus overhung on the shafts. As will be noted, the right hand bearings 8 and 9 are made somewhat longer than the left hand bearings to take care of the greater bearing pressure due to overhung wheels 17 and 18. The two sets of intermediate speed gear wheels comprising pinions 15 and 16 and gear wheels 17 and 18 are mounted on diametrically opposite sides of low speed gear wheel 11 and located between and meshing with gear wheels 17 and 18 is a high speed pinion 19 carried by a quill shaft 20. Quill shaft 20 extends entirely through hollow low speed shaft 10 and at the end of shaft 10 remote from pinion 19 is a bearing 21 for shaft 20. The other end of shaft 20 is carried in a bearing 22 which forms a dampening device to prevent chattering or vibration of pinion 19. Since gear wheels 17 and 18 are located on diametrically opposite sides of pinion 19, such pinion is balanced between them and exerts practically no pressure on its bearings. It is desirable that the pinion be permitted to assume its own position so as to mesh correctly with both gear wheels 17 and 18 and effect an equal division of the load. At the same time, however, the pinion must be held from chattering or vibrating. The bearing 22 is therefore more in the nature of a vibration preventing means and as shown comprises an inner ring 23 and an outer ring 24 connected together by a number of interleaving friction disks 25 pressed toward each other by suitable spring means as indicated at 26. Inner ring 23 carries a bearing lining 27 for shaft 20. Outer ring 24 is carried by a pedestal 28 bolted to lower casing half 5 and braced at its upper end by tie rod 29 which connects to upper casing half 6. With this arrangement pinion 19 can adjust itself axially and also sideways, quill shaft 20 possessing sufficient flexibility to permit of necessarily small sideways movements.

Pinion 19 and gear wheels 17 and 18 are housed in a gear casing extension 30 closed at the end by a cover plate 31.

It will be noted that the right hand bearings 8 and 9 project somewhat in the gear casing extension 30 projecting within the confines of the rim of gear wheels 17 and 18. This serves to minimize the overhang of gear wheels 17 and 18, bringing them as close to bearings 8 and 9 as possible.

Extending through quill shaft 20 is a high speed shaft 32 which in the case of a reduction gearing is the driving shaft. Shaft 32 is connected to shaft 20 by a suitable axial slip coupling 33 which serves to permit axial adjustment of either pinion 19 or the driving machine for example an elastic fluid turbine, independently of each other.

To ensure correct meshing of the gear wheels, one of them, as the gear wheel 18 may be fastened to its shaft by a bolted connection as indicated at 34. The holes for bolts 35 may be bored roughly before the gearing is assembled. The gearing is then assembled and put under some torque to bring all the gear wheels into correct meshing position after which the bolt holes are reamed to size and the bolts put into place and tightened.

With the above described arrangement I obtain a comparatively small and rigid casing of minimum axial length. Each gear shaft has only two bearings which saves materially in manufacturing cost and makes it much easier to align the gearing. Furthermore, since the bearings for each shaft are close together, any twisting of the casing affects their alignment but little and since the casing is of comparatively small axial length, it will be very rigid in a transverse direction and not likely to twist. This feature is of particular importance in connection with gearing for ship propulsion because of the fact that a ship's hull weaves more or less and the foundations provided are not always of a very substantial nature.

By the quill shaft arrangement wherein the driving shaft and high speed pinion shaft telescope each other and are both located inside the low speed wheel shaft, I obtain the benefit of a long shaft connection in a short structure and this enables the driving engine, for example, an elastic fluid turbine, to be placed directly adjacent the gearing without difficulty as respects bearing alignment, etc. In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a gearing, the combination of a casing, a hollow shaft journaled therein, a low speed gear wheel on said shaft, a high speed pinion in axial alignment with the low speed gear wheel, a shaft for the pinion which extends through said hollow shaft and is journaled therein at the end of the hollow shaft remote from the pinion, a plurality of intermediate speed shafts journaled in said casing, said last named shafts having overhung ends, low speed pinions on said last named shafts which mesh with said low speed gear wheel, and high speed gear wheels on said overhung ends which mesh with said high speed pinion.

2. In a gearing, the combination of a casing, a hollow shaft journaled therein, a low speed gear wheel on said shaft, a high speed pinion in axial alignment with the low speed gear wheel, a shaft for the pinion which extends through said hollow shaft, and has one end journaled therein at the end of the hollow shaft remote from the pinion, a vibration dampening means for holding the other end of said pinion shaft, a plurality of intermediate speed shafts journaled in said casing, said last named shafts having overhung ends, low speed pinions on said last named shafts which mesh with said low speed gear wheel, and high speed gear wheels on said overhung ends which mesh with said high speed pinion.

3. In a gearing, the combination of a casing having three pairs of bearings arranged in the same plane, a hollow shaft journaled in the central pair, and intermediate speed shafts having overhung ends journaled in the two outside pairs, meshing gear wheels on said shafts, gear wheels mounted on the overhung ends of said outside shaft, a pinion meshing with and balanced between said last named gear wheels, a quill shaft for said pinion which extends through said hollow shaft, and a high speed shaft which extends through said quill shaft and is connected to it at the end remote from the pinion.

4. In combination, a casing, a low speed gearing therein comprising a low speed gear wheel and two low speed pinions, shafts for said gear wheel and pinions, the gear wheel shaft being hollow and the pinion shaft extending beyond the casing, high speed gear wheels overhung on the ends of said pinion shafts, a pinion balanced between said high speed gear wheels and a shaft for the pinion which extends through said hollow shaft and has a journal therein.

5. In combination, a casing, a low speed gearing therein comprising a low speed gear wheel and two low speed pinions, shafts for said gear wheel and pinions, the gear wheel shaft being hollow and the pinion shaft extending beyond the casing, high speed gear wheels overhung on the ends of said pinion shafts, a pinion balanced between said high speed gear wheels and a shaft for the pinion which extends through said hollow shaft, a journal in the hollow shaft for one end of said last named pinion shaft, and a bearing for the other end of such shaft which forms a vibration preventing means for the high speed pinion.

6. In combination, a casing, a low speed gearing therein comprising a low speed gear wheel and two low speed pinions, shafts for said gear wheel and pinions, the gear wheel shaft being hollow and the pinion shaft extending beyond the casing, high speed gear wheels overhung on the ends of said pinion shafts, a pinion balanced between said high speed gear wheels and a shaft for the pinion which extends through said hollow shaft, and bearings for said last named pinion shaft, one of which is located in said hollow shaft.

7. In combination, a casing, a low speed gearing therein comprising a low speed gear wheel and two low speed pinions, shafts for said gear wheel and pinions the gear wheel shaft being hollow and the pinion shaft extending beyond the casing, high speed gear wheels overhung on the ends of said pinion shafts, a pinion balanced between said high speed gear wheels, a quill shaft for said pinion which extends through said hollow shaft, and a driving shaft which extends through said quill shaft and is connected to it at the end remote from the high speed pinion.

In witness whereof, I have hereunto set my hand this 19th day of October, 1920.

CHARLES L. HEISLER.